United States Patent [19]

Stumpe

[11] Patent Number: 4,677,557
[45] Date of Patent: Jun. 30, 1987

[54] MULTIPLE-AXLE VEHICULAR BRAKING EFFORT DISTRIBUTION METHOD AND SYSTEM

[75] Inventor: Werner Stumpe, Kornwestheim, Fed. Rep. of Germany

[73] Assignee: Robert Bosch GmbH, Stuttgart, Fed. Rep. of Germany

[21] Appl. No.: 679,744

[22] Filed: Dec. 10, 1984

[30] Foreign Application Priority Data

Dec. 20, 1983 [DE] Fed. Rep. of Germany ....... 3345913

[51] Int. Cl.$^4$ ........................................... B60T 13/74
[52] U.S. Cl. ................................ 364/426; 303/22 R; 303/6 C
[58] Field of Search ............ 364/463, 426; 303/22 R, 303/22 A, 24 R, 24 B, 6 R, 6 C; 188/181 C, 190, 195

[56] References Cited

U.S. PATENT DOCUMENTS

| | | | |
|---|---|---|---|
| 4,180,223 | 12/1979 | Amberg | 303/106 |
| 4,239,292 | 12/1980 | Nagase | 303/22 R |
| 4,289,358 | 9/1981 | Dufft et al. | 303/22 R |
| 4,327,413 | 4/1982 | Ruof | 364/426 |
| 4,327,414 | 4/1982 | Klein | 364/426 |
| 4,425,006 | 1/1984 | Bertrand et al. | 303/22 R X |
| 4,534,599 | 8/1985 | Wright et al. | 188/195 X |
| 4,560,210 | 12/1985 | Tani et al. | 303/22 R |

Primary Examiner—Parshotam S. Lall
Assistant Examiner—Thomas G. Black
Attorney, Agent, or Firm—Frishauf, Holtz, Goodman & Woodward

[57] ABSTRACT

A brake pedal of a braking system controls braking pressure to be applied to both the front as well as the rear axles of a vehicle, typically a truck or other heavy vehicle. To distribute braking effort, properly, between the brakes on the wheels of the front and rear axles, based on loading of the vehicle, the load is sensed by a load sensor (3) at one axle, preferably the rear axle, a static loading signal is obtained based on load applied on the rear axle by filtering the derived load signal in a filter (8), and stored; the loading applied to the front axle, then, is calculated based on known vehicle characteristics, retained, for example, in a table, or by interpolation of sensed static load on the rear axle and known consequent loading on the front axle, based on previously measured empty and full loading of the vehicle; respective first brake control signals for the axles are then determined based on the static loading which signals are modified to form a second composite brake control signal by adding the dynamic loading signal, as filtered, from the rear axle only, to both the brake control signals of the front and the rear axle.

16 Claims, 4 Drawing Figures

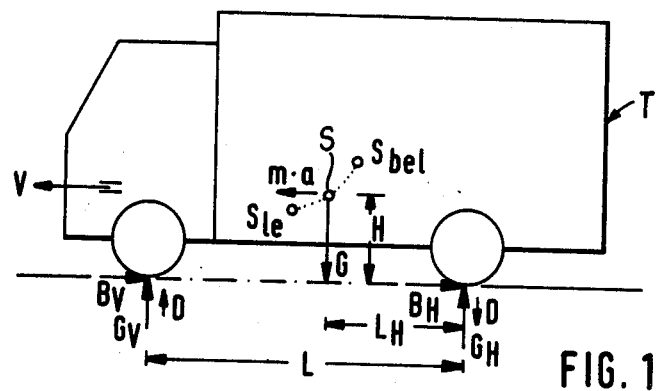
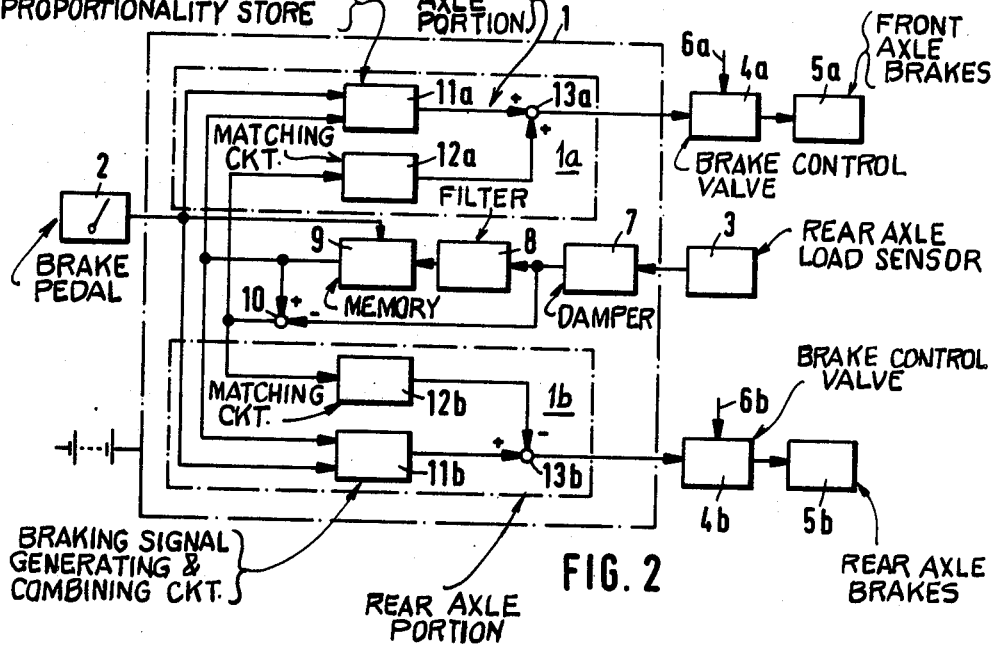

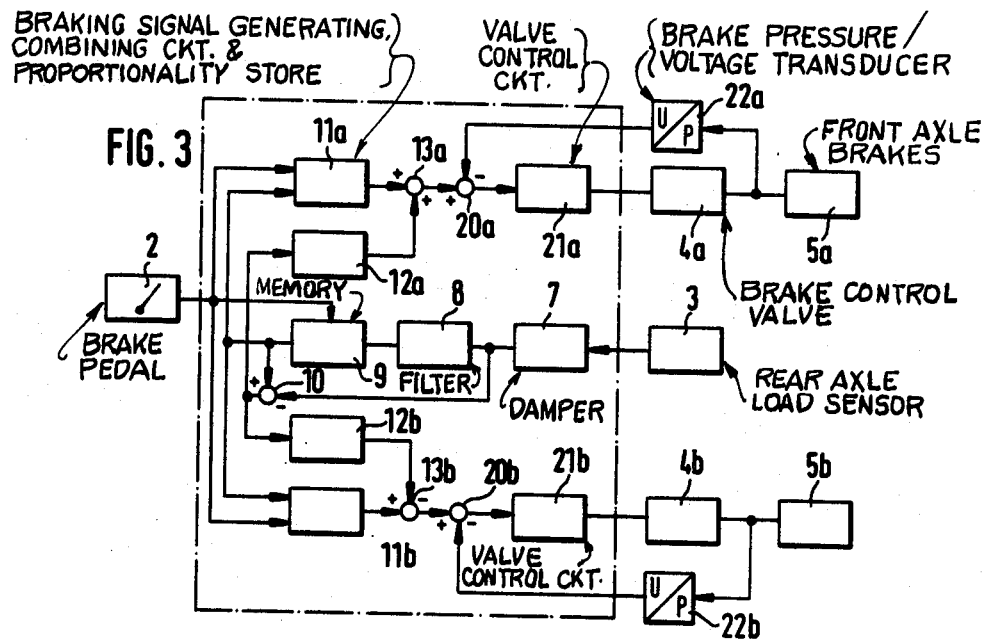
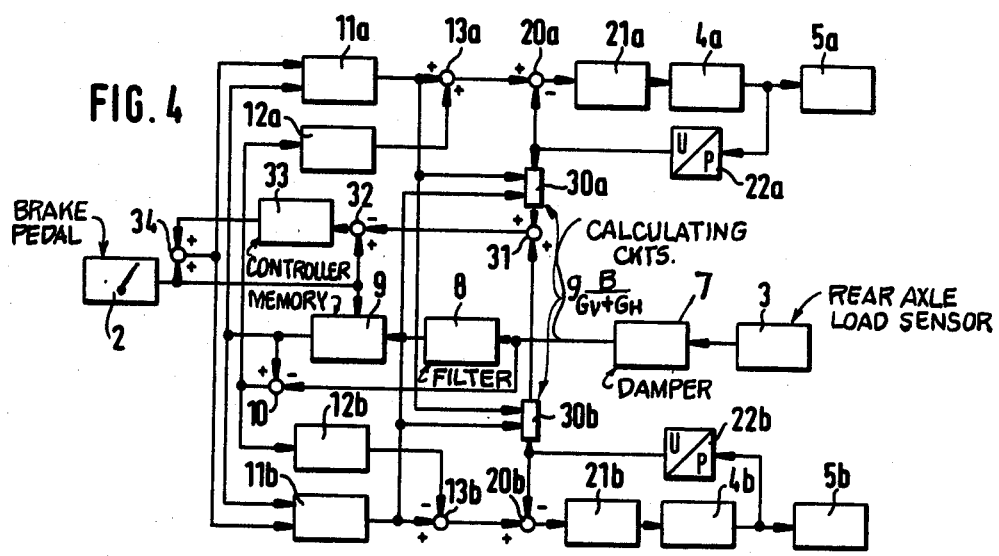

MULTIPLE-AXLE VEHICULAR BRAKING EFFORT DISTRIBUTION METHOD AND SYSTEM

Reference to related application, assigned to the assignee of the present application:

PCT Publication WO No. 83/03230, to which U.S. Pat. No. 4,606,586 corresponds.

The present invention relates to a braking system and braking method for multi-axle vehciles, and more particularly for multi-axle automotive-type vehicles, especially trucks and the like, subjected to varying loading, in which the braking effort at the respective axles or wheels of the vehicles can be controlled in accordance with the loading placed on the respective axles or wheels of the vehicles.

BACKGROUND

It has previously been proposed to control the braking effort applied to various brakes in a multi-axle vehicle—see the referenced U.S. Pat. No. 4,606,586, PCT Publication WO No. 83/03230. The publication describes a system in which the loading of the axles is separately determined and control signals are derived from this determination to then, in turn, control the distribution of braking effort at the respective wheels of the respective axles.

The system requires separate determination of loading at the respective axles, which requires a multiplicity of sensors.

THE INVENTION

It is an object to provide a multi-axle braking effort distribution method and system in which the requirement for weight sensors is reduced and in which the braking effort distribution is continuously matched to the then existing conditions of operation of the vehicle.

Briefly, the static and dynamic axle loading on one of the axles is determined, and loading signals received from a sensor associated with that axle are derived. The loading signals are separated into static signals and dynamic changing signals, the separation, for example, being carried out by means of filters. The static loading signal is stored in a memory. The static axle load signal is then subtracted from the overall loading signal during a braking operation to derive a dynamic load signal representative of the dynamic loading of the axle. A static load signal is obtained for another axis; this can be a fixed value, for example, derived from design data of the vehicle, or a measured static value. A command signal is obtained, for example representative of a brake pedal deflection—or a commanded braking pressure. Based on the static axle load signals, respective first braking control signals for the wheels of the respective axles are generated; due to possible non-uniform load distribution on the vehicle, or its design characteristics, the braking efforts at different axles may well be different. The dynamic portion, which was previously separated out from the overall loading signal on one axle is then superimposed—with appropriate sign on the brake control signals of both of the axles, and the thus obtained modified or composite brake control signal is then applied as a control signal to the actual braking systems of the wheels at the respective axles.

The system and method has the advantage that only a single axle load sensor is needed, the signals of which, both the static as well as the dynamic axle loading, can be obtained. The static portion which is separated out, for example by filtering, and stored, for example at initiation of braking or in advance thereof, is then used as a basic braking force for the brakes of for example both axles, modified to form a composite signal by superimposition of the varying dynamic portion of the loading signal during the entire braking event. The control of the basic braking effort or braking force is measured at one of the axles, preferably the rear axle, and is dependent, for example proportional, to a measured load. It is not usually necessary to measure the static loading on the other axle since that loading can be derived from the measured value on the measured axle; by extrapolation, and, specifically, by knowing the design and structural features of the vehicle. One way of obtaining an estimated or computed loading on the axle which was not measured is to determine first the loading on that axle, with the vehicle unloaded, and the loading on that axle with the vehicle fully loaded. Similar measurements can then be made with respect to the measured axle, for example the rear axle, and, once the rear axle has been measured, the loading values for the other axle can be obtained by interpolation between maximum and minimum load with respect to the measured load at the measured axle. It is, however, also readily possible to assume that the static loading on all the axles is the same, or differs by a fixed and known factor. The loading sensed on the rear axle, for example, of trucks, trailers of trucks, and similar vehicles can be used usually also directly as a measure of loading on the other axle or axles.

The invention is not limited to determining the loading on two-axle vehicles; it can be used also if, in addition to the distribution of braking pressure, other control criteria are to affect the braking effort which is actually applied, for example control by an anti-brake lock or skid system (ABS). The command value controlled by the operator of the vehicle may be directly controlled by the operator or the command value may be a computed value based on the operator's control of a brake signal, for example may be a value which depends not only on the commanded braking pressure but also on slip of at least one of the wheels with respect to a road surface therebeneath, and, thus, controlled to differ due to the operation of an anti-skid system—for example as described in the referenced PCT Publication WO No. 83/03230.

DRAWINGS

FIG. 1 shows, highly schematically, the outline of a truck and various force relationships, in vectorial representation, in which the respective explanatory legends are used in the part of the specification;

FIG. 2 is a basic schematic diagram of a brake control system with pressure control;

FIG. 3 is a schematic diagram similar to FIG. 2 with pressure control; and

FIG. 4 is a diagram similar to FIG. 3, but expanded to illustrate a further improvement.

DETAILED DESCRIPTION

Basic considerations, with reference to FIG. 1:

A truck which has an instantaneous overall weight represented by the vector G is operable over a road surface. The weight G is applied at the then existing center of gravity S. The diagram of FIG. 1 additionally shows two further centers of gravity, the center $S_{1e}$ if the vehicle is empty, and $S_{bel}$ if the vehicle is full or loaded. All three centers of gravity are located on a curve, shown in dotted line in FIG. 1, which illustrates the change in position of the center of gravity as the vehicle is loaded.

At the assumed loading G, the support force at the rear or hindmost axle is shown by the vector $G_H$, and at the forward or front axle $G_V$. The braking forces to be applied to the respective wheels are shown at $B_V$ for the front wheels of the front axle, and $B_H$ for the rear wheels of the rear or hindmost axle. The diagram of FIG. 1 assumes that the vehicle is moving forward, with a speed shown by vector V. Additional dynamic load portions will be applied to the wheels, illustrated by the vectors D if the direction of movement is in accordance with the arrow V. Of course, upon reverse movement, the dynamic loading forces D will be reversed.

The frictional forces at the respective axles are given as follows, in which $f_{VA}$ and $f_{HA}$ are the frictional forces of the respective front and rear or hindmost axle:

$$f_{VA} = B_V/(G_V + D) \quad (1)$$

$$f_{HA} = B_H/(G_H - D) \quad (2)$$

The foregoing equations assume that D is positive upon forward movement, and negative upon reverse movement.

If the frictional loading at both axles is to be the same, then the distribution of braking effort or braking force will be:

$$\frac{B_V}{B_H} = \frac{G_V + D}{G_H - D} \quad (3)$$

The dynamic loading, D, during braking, is a variable value. Let it be assumed that a is vehicle deceleration—and g acceleration due to gravity, then:

$$a = g\frac{B_V}{G_V + G_H} + g\frac{B_H}{G_V + G_H} \quad (4)$$

FIG. 2 shows a first embodiment of a brake distribution control system 1, in connection with which, also, the method of operation will be explained.

An operator-controlled brake control element 2, such as a brake pedal, the deflection of which is sensed, provides a brake command signal. An axle load or weight sensor 3, of any suitable and well known construction, for example a compression load sensor, is secured to the rear axle of the vehicle, for example the truck T (FIG. 1). The front axle brakes are shown schematically at 5a, and the rear axle brakes at 5b. Only one brake 5a, 5b is shown, although of course in a four-wheel vehicle the brakes will be operated in tandem, one for each wheel of the axle. Each one of the front and rear axle brakes has associated brake control valves 4a, 4b in which, upon control of the brake control valves, suitable braking pressures are commanded to be applied to the respective brakes 5a, 5b. The arrows 6a, 6b schematically indicat supply of pressurized braking fluid.

The axle load sensor 3 furnishes an axle load signal which is representative of the instantaneous measured axle loading. This signal is applied over a first damping element 7 which may, for example, be in form of a filter to filter variations due to movement of the axle, for example due to vehicle vibrations, uneven conditions of the road, or oscillations. The output available from damper 7 is a signal which is a composite formed by the static axle loading $G_H$ (FIG. 1) at the rear axle, and the dynamic portion D which occurs upon braking. A separating element, also forming a further damping element 8, for example again a filter, separates out the dynamic portion. The remainder, which will be a signal representative of the static loading on the rear axle only, is applied to a memory 9. Upon operation of the brake pedal 2, the signal from filter 8 is stored in the memory 9.

The output signal from the memory 9 is supplied to combining circuits 11a and 11b, for the front and rear axle, respectively. The combining circuits, additionally, receive the command signal from the brake pedal 2. The combining circuits generate a signal which is a combination formed by the command signal, as commanded by the operator, for example the driver of the truck T, and the loading signal derived from the static loading as stored in the memory 9. The combining circuits 11a, and 11b generate a first braking pressure control signal.

The signals from memory 9 are similarly applied to the combining circuits 11a, 11b. In the combining circuit 11a, a front axle loading representative of the axle loading $G_V$ (FIG. 1) must be generated, derived from the loading as measured on the rear axle, and as represented in the static loading signal stored in the memory 9. The signal representative of front engine loading can be obtained by associating a function generator or a stored cable of load values which will appear at the front axle upon a predetermined load being applied to the rear axle, for example by interpolation. The relationship between the loading on the axles at the front axle and the measured value at the rear axle can be previously determined and stored; it is also possible to store the loading at the front axle if the vehicle is empty, and the loading at the front axle when the vehicle is full, and, depending on the difference, and on the actual load as sensed by the load sensor at the rear axle, and a previously determined sensed load value at the rear axle without loading of the vehicle to determine the front axle loading by interpolation between the extreme values at the front axle, that is, empty or full vehicle. This relationship, loading as stored in memory 9 and association of the respective value to the front axle, can be stored in the combining circuit 11a, for example.

In addition to the storage of the respective static values, the dynamic portion D of axial loading is applied, in form of a signal, to a modulating stage 10, which forms the difference between the input signal to the filter 8 and the static signal in memory 9, to derive, only, the dynamic signal removed by the filter 8 from the composite sensed load signal. The difference from modulator 10, which may simply be a subtraction circuit, is applied to signal matching circuits 12a, 12b which convert the respective signals representative of the dynamic portion to brake pressure control signals. These dynamic brake pressure control signals are applied to additional combining circuits 13a, 13b, which combine the first brake pressure control signals, derived on the basis of the operation of the brake pedal 2 and static loading with the instantaneous dynamic axle load conditions, to provide a composite corrected brake pressure control signal to the respective brake control valves 4a, 4b.

FIG. 2 illustrates only one-point or forward control of braking pressure, without feedback. Consequently, the level of the brake pressure control signal applied to the control valves 4a and 4b must be suitably varied so that the braking pressure applied to the brakes 5a, 5b will be proportionately controlled.

The entire circuitry including the elements 7 through 13a, 13b can be constructed as an electronic module, preferably subdivided into two portions 1a, 1b, for the front axle and the rear axle, respectively. The circuits 11a, 11b may be identical, although the circuit 11a also must store a proportionality or interpolation table. An identical circuit can be used for element 11b in which, then, the table would provide a continuous value of "1" or merely act as a pass-through or buffer element transferring merely the value applied by the memory 9 without modification.

Embodiment of FIG. 3: The structure of FIG. 3 is identical to that of FIG. 2, with the addition, however, that the control circuits for the brake control vales 4a, 4b include a further subtraction circuit 20a, 20b and a feedback loop including a pressure-voltage converter 22a, 22b, connected to sense braking pressure as controlled by the brake control valves 4a, 4b, converting the sensed pressure into a voltage and providing a feedback to the subtraction circuits 20a, 20b, the thus fed back circuit then being applied to suitable closed-loop controllers 21a, 21b.

OPERATION

The pressure at the brakes 5a, 5b is measured and transduced in transducers 22a, 22b into electrical voltage signals. The measured pressure is then fed back to the differentiators 20a, 20b, respectively. In this example, the level of the output signals of the combining circuits 13a, 13b control the braking pressure. The valve control circuits 21a, 21b control the brake valve 4a, 4b in such a manner that the braking pressure actually applied by the brake valves 4a, 4b corresponds to the commanded value at the output of the combining circuits 13a, 13b.

Embodiment of FIG. 4: The general arrangement is similar to FIG. 3, except that two additional circuits 30a, 30b and three combining circuits 31, 32 and 34, as well as an additional controller 33, are provided.

The command signal from the brake pedal 2 is not applied directly to the combining circuits 11a, 11b, but only through the adding circuit 34. This system operates in accordance with the above-discussed equation (4). Two calculating circuits 30a, 30b are provided, receiving respective inputs and calculating, respectively, for the front axle and for the rear axle the equations:

$$\text{front axle } g \frac{B_V}{G_V + G_H}$$

$$\text{rear axle } g \frac{B_H}{G_V + G_H}$$

and deriving corresponding signals. The output signals of the combining circuits 11a, 11b, of course, correspond to the axial loadings $G_V$ and $G_H$, respectively. These signals are thus applied to the calculating circuits 30a, 30b, and the value g, acceleration due to gravity, is stored in the calculating circuits 30a, 30b. The braking level signals $B_V$ and $B_H$ are derived from the brake pressure/voltage transducers 22a, 22b, respectively. The calculated output signals, in accordance with the above equations, are added in adder 31, thus forming the equation (4) derived above. The signal thus generated corresponds to vehicle deceleration a. It is associated with the command signal derived from the position of the brake pedal 2. If a difference remains, indicating that either too much braking—corresponding to brake pedal position, or too little, results, the controller 33 and the adder 34 will, respectively, modify the command signal from the brake pedal 2 by increasing or decreasing the command signal to match the desired deceleration, and thus matching the braking pressure actually applied by the brakes 5a, 5b under control of the brake valves 4a, 4b as desired by the operator by application of pressure to the brake pedal 2.

Various changes and modifications may be made; for example, a vehicle deceleration sensor can be used, which merely is a simple acceleration sensor responding, however, to deceleration, and providing an output signal which controls the level of braking pressure permitted to be applied to the brakes 5a, 5b by the brake valves 4a, 4b in accordance with desired deceleration, as determined by deflection of the brake pedal 2. Various other changes and modifications may be made, and any features described herein may be used with any of the others within the scope of the inventive concept.

For completeness's sake, FIG. 1 also illustrates the spacing L between the front and rear axles, and the distance $L_H$ between the rear axle and the center of gravity at any instant. The static load signals $G_V$ and $G_H$ are invarying for any given loading of the vehicle T and may be stored upon an initial operation of the brake or, for example, upon beginning of a trip or run; the dynamic loading, as represented by the vectors D, changes continuously during any braking operation and, thus, is continuously applied by the filter 8 to the combining circuit 10 for continuous modification through the matching circuits 12a, 12b of the first brake pressure control signal derived from the combining circuits 11a, 111b in the respective adding circuits 13a, 13b, in which the addition is carried out algebraically correct, that is, at the front axle, the dynamic loading signal D is added to the static load signal $G_V$, whereas, at the rear axle, it is subtracted, as shown in FIGS. 2 to 4. The term "combining circuit" and "adding circuit" thus, as used herein, also includes subtraction or, in other words, combination with algebraically correct signs.

What is claimed is:

1. Multi-axle vehicle braking system for controllable braking effort distribution among the wheels of the axles having
   a brake control element (2) generating a command braking signal;
   an axle load sensor (3) coupled to one axle of the vehicle and generating axle load signals including a static axle load signal portion;
   a braking effort distribution controller (1) having the command braking signal and the axle load signal applied thereto;
   brake control means (4a, 5a; 4b, 5b) connected to and controlled by said braking effort distribution controller (1) and commanding controlled braking effort at the respective axles in dependence on axle loading,
   wherein, in accordance with the invention,
   the braking effort distribution controller (1) comprises
   separating means (8) for separating the static axle load signal portion from the signals received from the axle load sensor (3);

storage means (9) for storing the static axle load signal ($G_H$) received from the separating means;

subtracting means (10) for subtracting the static axle load signal portion from the axle load signal derived from the axle load sensor (3) during a braking operation, to derive a dynamic load signal representative of dynamic load (D) on the axle during braking;

combining means (11a) coupled to and receiving the static axle load signal portion, representative of static axle loading on said one axle and deriving a static load signal representative of the static load ($G_V$) on another axle, said combining means including storage means for storing data representative of loading on the other axle as a function of the known load on said first axle, and as a function of vehicle characteristics;

braking signal generating circuit means (11a, 11b) coupled to the brake control element (2), receiving said static axle load signals and generating a first brake control signal for each axle;

second combining circuit means (13a, 13b) coupled to and receiving the first brake control signal for each axle, and further coupled to and receiving said dynamic load signal (D) and modifying the first brake control signal to derive a second composite brake control signal for each axle, said second composite brake control signal controlling the brake control means (4a, 5a; 4b, 5b) of the respective axles.

2. System according to claim 1, including damping means (7) connected between the load sensor and said separating means to filter signal components representative of oscillations or variations of the axle due to movement of the axle.

3. System according to claim 2, wherein said damping means (7) comprises a low-pass filter.

4. System according to claim 1, further including (FIG. 2) a closed control loop (20a, 21a, 22a; 20b, 21b, 22b) coupled to and receiving the second composite brake control signal, and sensing actual braking effort as commanded by said brake control means, including a brake control means controller (21a, 21b) to control braking pressure in a closed control loop.

5. System according to claim 1, further including (FIG. 4) deceleration signal generating means (30a, 30b, 31) generating a signal representative of vehicle deceleration upon braking;

and a control loop (33, 34, 32) coupled to the brake control element and applying a brake control signal to said first combining circuit means (11a, 11b) which is representative of actual vehicle deceleration and as commanded by said brake control element.

6. System according to claim 4, wherein
one of said axles is a front axle, and the other one of said axles is a rear axle; and the deceleration signal generating means comprises
calculating circuit means (30a, 30b) respectively calculating deceleration of the vehicle, and having applied thereto the second composite brake control signal for the brakes of each axle, as well as the signals representative of static loading on the respective axle, and calculating respective deceleration based on this relationship:

for the front axle: $\dfrac{B_V}{G_V + G_H}$ for the rear axle: $\dfrac{B_H}{G_V + G_H}$ wherein $B_V$ and $B_H$ are signals representative of the second composite brake control signal for the front axle and the rear axle, respectively; and $G_V$ and $G_H$ are signals representative of static loading on the front axle and the rear axle, respectively;

and summing means (31) adding the calculated deceleration signals;

means (32) comparing the actual vehicle deceleration with commanded vehicle deceleration as represented by said command braking signal;

and control means (33, 34) coupled to one of said combining means for modifying said first brake control signal as a function of deviation between actual deceleration and commanded deceleration.

7. System according to claim 1, further including (FIG. 4) deceleration signal generating means (30a, 30b, 31) generating a signal representative of vehicle deceleration upon braking;

and a control loop (33, 34, 32) coupled to the brake control element and applying a brake control signal to said first combining circuit means (11a, 11b) which is representative of actual vehicle deceleration and as commanded by said brake control element.

8. System according to claim 7, wherein
one of said axles is a front axle, and the other one of said axles is a rear axle; and the deceleration signal generating means comprises
calculating circuit means (30a, 30b) respectively calculating deceleration of the vehicle, and having applied thereto the second composite brake control signal for the brakes of each axle, as well as the signals representative of static loading on the respective axle, and calculating respective deceleration based on this relationship:

for the front axle: $\dfrac{B_V}{G_V + G_H}$ for the rear axle: $\dfrac{B_H}{G_V + G_H}$ wherein $B_V$ and $B_H$ are signals representative of the second composite brake control signal for the front axle and the rear axle, respectively; and $G_V$ and $G_H$ are signals representative of static loading on the front axle and the rear axle, respectively;

and summing means (31) adding the calculated deceleration signals;

means (32) comparing the actual vehicle deceleration with commanded vehicle deceleration as represented by said command braking signal;

and control means (33, 34) coupled to one of said combining means for modifying said first brake control signal as a function of deviation between actual deceleration and commanded deceleration.

9. System according to claim 1, wherein said separating means (8) comprises a filter.

10. Method of controlling braking effort at the respective axles of a multi-axle vehicle, and distributing braking effort at the respective axles in dependence on loading of the vehicle, said vehicle having
a brake control element (2) generating a command braking signal;
an axle load sensor (3) coupled to one axle of the vehicle and generating axle load signals including a static axle load signal portion;
a braking effort distribution controller (1) having the command braking signal and the axle load signal applied thereto;
brake control means (4a, 5a; 4b, 5b) connected to and controlled by said braking effort distribution controller (1) and commanding controlled braking effort at the respective axles in dependence on axle loading;
comprising, in accordance with the invention, the steps of
separating the static axle load signal portion ($G_H$) from the axle load signals and deriving a first static axle load signal ($G_H$);
storing the static first axle load signal ($G_H$);
subtracting the stored static first axle load signal from said axle load signals during a braking operation and deriving a dynamic axle load signal (D) representative of dynamic load on the first axle during the braking operation;
storing data representative of loading on an axle other than said one axle, as a function of the known load on said first axle;
calculating, based on said stored data, a static other axle load signal for said other axle based on the stored first axle load signal portion;
generating a first brake control signal for each axle as a function of
(a) the command braking signal and
(b-1) the static first axle load signal portion ($G_H$) as derived and separated from said one axle, and
(b-2) the static other axle load signal ($G_V$) as calculated for another axle;
generating second brake control signals dependent on the dynamic load signal (D) by combining the dynamic load signal (D) separated from the axle load signals of said one axle with respective separate first brake control signals for each respective axle to obtain respective separate second composite brake control signals for each axle;
and controlling actual braking effort at the wheels of the respective axles by the respective composite second brake control signal.

11. Method according to claim 10, wherein said separating step to separate the static axle load signal and the dynamic axle load signal derived from said axle load sensor comprises filtering.

12. Method according to claim 10, including the step of removing signals from the axle load sensor representative of axle oscillations or axle movement due to road conditions and not representative of loading.

13. Method according to claim 10, wherein said step of controlling braking effort comprises controlling a fluid braking pressure in a closed control loop.

14. Method according to claim 13, wherein
one of said axles is a front axle, and the other one of said axles is a rear axle; and
said step of sensing deceleration comprises calculating vehicle deceleration at the front and rear axles, respectively, based on the relationships:

$$\text{for the front axle: } \frac{B_V}{G_V + G_H}$$

$$\text{for the rear axle: } \frac{B_H}{G_V + G_H}$$

wherein $B_V$ and $B_H$ are signals representative of the second composite brake control signal for the front axle and the rear axle, respectively;
$G_V$ and $G_H$ are signals representative of static loading on the front axle and the rear axle, respectively;
and further including the step of combining the sensed deceleration signals of the front and rear axle.

15. Method according to claim 10, including the step of sensing vehicle deceleration;
comparing the sensed vehicle deceleration with commanded vehicle decleration as commanded by said brake controller and deriving an error signal if actual deceleration and commanded deceleration differ;
and additionally controlling the combining means as a function of said error signal.

16. Method according to claim 15, wherein
one of said axles is a front axle, and the other one of said axles is a rear axle; and
said step of sensing deceleration comprises calculating vehicle deceleration at the front and rear axles, respectively, based on the relationships:

$$\text{for the front axle: } \frac{B_V}{G_V + G_H}$$

$$\text{for the rear axle: } \frac{B_H}{G_V + G_H}$$

wherein $B_V$ and $B_H$ are signals representative of the second composite brake control signal for the front axle and the rear axle, respectively;
$G_V$ and $G_H$ are signals representative of static loading on the front axle and the rear axle, respectively;
and further including the step of combining the sensed deceleration signals of the front and rear axle.

* * * * *